United States Patent
Weiss et al.

(10) Patent No.: US 10,576,436 B2
(45) Date of Patent: Mar. 3, 2020

(54) DEVICE AND METHOD FOR THE REMOVAL OF POLYCRYSTALLINE SILICON RODS FROM A REACTOR

(71) Applicant: Wacker Chemie AG, Munich (DE)

(72) Inventors: Tobias Weiss, Mehring (DE); Udo Almasy, Tann (AT); Stefan Faerber, Tuessling (DE); Reiner Pech, Neuoetting (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/782,865

(22) PCT Filed: Mar. 20, 2014

(86) PCT No.: PCT/EP2014/055604
§ 371 (c)(1),
(2) Date: Oct. 7, 2015

(87) PCT Pub. No.: WO2014/166717
PCT Pub. Date: Oct. 6, 2014

(65) Prior Publication Data
US 2016/0067662 A1 Mar. 10, 2016

(30) Foreign Application Priority Data
Apr. 10, 2013 (DE) .......... 10 2013 206 339

(51) Int. Cl.
*B01J 4/00* (2006.01)
*B66F 19/00* (2006.01)

(52) U.S. Cl.
CPC ............... *B01J 4/001* (2013.01); *B66F 19/00* (2013.01)

(58) Field of Classification Search
CPC .. H01L 21/76254; H01J 37/3244; B66C 3/02; B66C 1/46; C01B 33/035; B66F 11/00; B66F 19/00; C23C 16/4418; B01J 4/001
USPC .............................................. 294/19.2, 119.3
See application file for complete search history.

(56) References Cited

U.S. PATENT DOCUMENTS

| 4,848,587 A | 7/1989 | Nipp |
| 5,382,419 A | 1/1995 | Nagai et al. |
| 6,354,643 B1 * | 3/2002 | Podejko ................ A63B 47/02 280/47.34 |
| 2010/0001106 A1 | 1/2010 | Schaefer et al. |
| 2010/0041215 A1 * | 2/2010 | Kim ...................... C01B 33/035 438/488 |
| 2010/0043972 A1 | 2/2010 | Baldi et al. |

(Continued)

FOREIGN PATENT DOCUMENTS

| CN | 104066677 A | 9/2014 |
| DE | 102007027110 A1 * | 12/2008 |

(Continued)

OTHER PUBLICATIONS

Shravan Kumar Chunduri, "Innovations in inertia", Apr. 2, 2013, Photon International, Apr. 2013 (Year: 2013).*

*Primary Examiner* — Stephen A Vu
(74) *Attorney, Agent, or Firm* — Brooks Kushman P.C.

(57) ABSTRACT

A device for removing polycrystalline silicon rod pairs from a Siemens reactor has a body dimensioned to fit over a single rod pair. Once the rod pair is within the body, the body and enclosed rod pair is removed.

20 Claims, 1 Drawing Sheet

(56) References Cited

U.S. PATENT DOCUMENTS

| | | | |
|---|---|---|---|
| 2010/0215562 A1* | 8/2010 | Sanchez | B01J 8/1827 423/349 |
| 2010/0270317 A1* | 10/2010 | Kieling | A45C 3/001 220/592.25 |
| 2011/0070439 A1* | 3/2011 | Sofin | C01B 33/035 428/401 |
| 2011/0229717 A1 | 9/2011 | Kraus | |
| 2012/0060562 A1* | 3/2012 | Wochner | B23K 13/015 65/441 |
| 2012/0175613 A1 | 7/2012 | Netsu et al. | |
| 2012/0237678 A1 | 9/2012 | Bovo et al. | |
| 2013/0269295 A1* | 10/2013 | Mattes | B32B 9/045 53/428 |
| 2013/0309524 A1* | 11/2013 | Vietz | B02C 23/08 428/641 |
| 2015/0003952 A1 | 1/2015 | Kurosawa et al. | |

FOREIGN PATENT DOCUMENTS

| | | |
|---|---|---|
| DE | 102009027830 B3 | 1/2011 |
| DE | 102012208473 A1 * | 11/2013 |
| EP | 2 810 919 A1 | 12/2014 |
| JP | S63296840 A | 12/1988 |
| JP | 2002210355 A | 7/2002 |
| JP | 101495682 A | 7/2009 |
| JP | 2012-021015 * | 2/2012 |
| JP | 2013-159504 A | 8/2013 |

\* cited by examiner

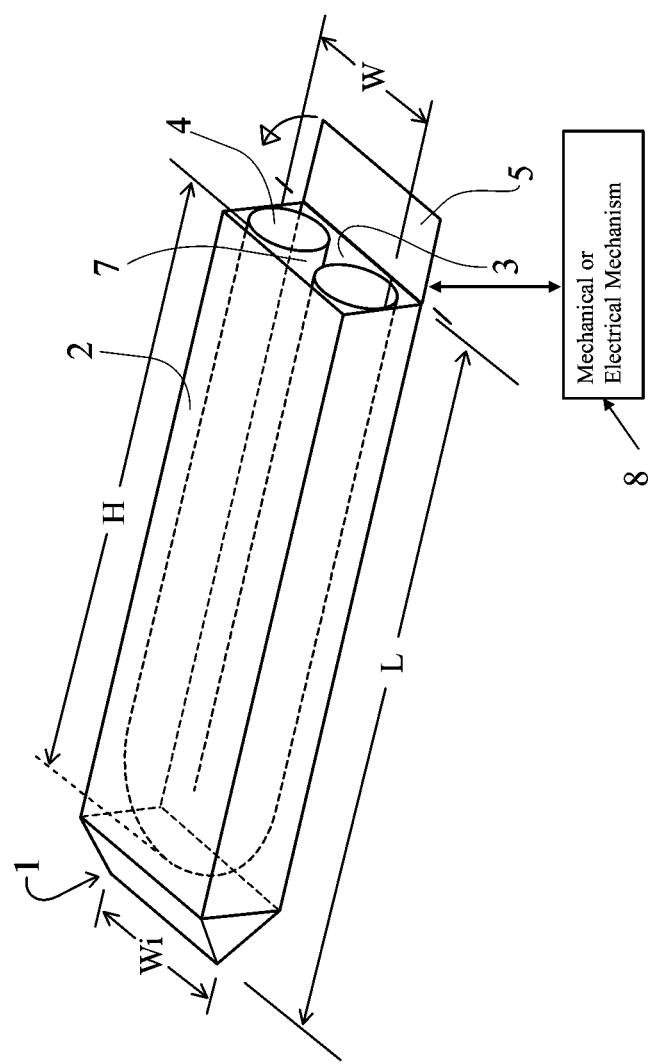

DEVICE AND METHOD FOR THE REMOVAL OF POLYCRYSTALLINE SILICON RODS FROM A REACTOR

CROSS REFERENCE TO RELATED APPLICATIONS

This application is the U.S. National Phase of PCT Appln. No. PCT/EP2014/055604 filed Mar. 20, 2014, which claims priority to German Application No. 10 2013 206 339.3 filed Apr. 10, 2013, the disclosures of which are incorporated in their entirety by reference herein.

BACKGROUND OF THE INVENTION

1. Field of the Invention

The invention relates to a device and a method for the removal of polycrystalline silicon rods from a reactor.

2. Description of the Related Art

High-purity polycrystalline silicon (polysilicon) serves as a starting material for producing monocrystalline silicon for semiconductors by the Czochralski (CZ)—or zone melting (ZM)—method, and also for producing monocrystalline or polycrystalline silicon by various drawing and casting methods for producing solar cells for photovoltaics.

Polysilicon is usually produced by the Siemens process, which is a process whereby a reaction gas comprising one or more silicon-containing components and optionally hydrogen is introduced into a reactor comprising substrates heated by direct passage of current, wherein silicon deposits in solid form onto the substrates. The silicon-containing components are preferably silane ($SiH_4$), monochlorosilane ($SiH_3Cl$), dichlorosilane ($SiH_2Cl_2$), trichlorosilane ($SiHCl_3$), tetrachlorosilane ($SiCl_4$), or mixtures of these substances.

The Siemens process for depositing silicon in solid form onto substrates, is usually carried out in a deposition reactor (also termed a "Siemens reactor"). In the most common embodiment, the reactor comprises a metallic base plate and a coolable bell which is seated on the base plate in such a manner that a reaction space is formed in the interior of the bell. The base plate is furnished with one or more gas inlet openings and one or more off-gas openings for the departing reaction gases, and also with holders with which the substrates are held within the reaction space and are supplied with electric power.

Each substrate consists usually of two thin filament rods and a bridge which joins the generally adjacent rods at their free ends. The filament rods plug vertically into the electrode situated on the reactor base, via which electrodes the connection to the power supply is made. On the heated filament rods and the horizontal bridge, high-purity polysilicon deposits, as a result of which the diameter thereof increases with time. After the desired diameter is achieved, the process is terminated.

In this method, U-shaped silicon rods are obtained which can be several meters high and can weigh several 100 kg. For a process which is as economical as possible, it is necessary to deposit to maximum rod diameters.

The removal of very large and heavy rods from the reactor is a problem. The removal should proceed with as low contamination as possible and as economically as possible, namely should be associated with a minimum idle time of the reactor. It should also be possible to remove inclined, unevenly shaped rods (e.g. elliptical or club-shaped rods, that is to say with rods with varying rod diameter over the rod height) or rods that touch each other safely.

US 20120237678 A1 discloses a device for the removal of polycrystalline silicon rods, comprising a body having outer walls which is dimensioned in such a manner that the rods are enclosed by the outer walls, wherein each outer wall contains a door in order to permit access to at least one of the rods. In a preferred embodiment, the inner walls are lined with a polymer in order to prevent contamination of the polycrystalline silicon rods.

US 20100043972 A1 discloses a further device for the removal of polycrystalline silicon rods, comprising a wall having an inner wall, an outer wall and a multiplicity of connections between inner wall and outer wall, and a gap between inner wall and outer wall, an access window in the outer wall, a baseplate, and a multiplicity of contacts on the baseplate, wherein the inner wall and outer wall are cylindrical and concentric, the gap is dimensioned in order to receive a multiplicity of silicon rods situated on the contacts of the baseplate, wherein the access window is made such that access to the silicon rods is made possible. The rods can be withdrawn via the access window.

It is disadvantageous of the devices described above, that in the case of rods standing at an incline, or in the event of a partially dropped batch, which occurs not infrequently, use thereof is impossible. Therefore, this device is not very practical for economic production of polysilicon.

This also applies to the method claimed in DE 10 2009 027 830 B3 for withdrawal of polycrystalline silicon rods from a reactor, wherein a rigid and automated guidance with a computer-controlled recognition method based on calibration points is operated over the open reactor and the rod pairs are gripped by means of mechanical or pneumatic clamping device and these are then deposited into a transport device.

JP 63296840 A discloses a device for the removal of silicon rods from a deposition reactor, in which a single rod pair is fixed using clamps and is lifted out from the reactor at the side.

JP 2002210355 A likewise discloses a device for the removal of silicon rods, comprising an arm movable in three dimensions, at the end of which a clamping device is mounted with which the silicon rods can be lifted out of the reactor.

It is disadvantageous in these two devices that the rods can only be withdrawn from the outside inwards from the completely open reactor. A targeted removal of a defined silicon rod, e.g. from an internal rod circle, which is sometimes desirable, is impossible using the described device.

US 20120175613 A1 discloses a method for producing a polycrystalline silicon piece, consisting of a CVD process for producing a polycrystalline silicon rod by deposition of silicon on a filament wire, one end of which is connected to a first electrode, and the other end of which is connected to a second electrode, a process for withdrawal of the polycrystalline silicon rod from the reactor, and a comminution process of the silicon rod into silicon pieces, wherein, before the comminution process, at least 70 mm are removed from the electrode end of the polycrystalline silicon rod (foot shortening process). In a preferred embodiment, the surface of the polycrystalline silicon rod, before removal from the reactor, is covered with a bag-like piece of polyethylene. The withdrawal itself can proceed by means of a crane or the like. With respect to the above described problems in removal of the rods by means of known devices, US 20120175613 A1 leaves no indications of a solution or suggestions.

It would be desirable to provide a rod removal device which solves the problems described above.

SUMMARY OF THE INVENTION

The invention relates to a device for the removal of polycrystalline silicon rods from a reactor containing U-shaped rod pairs, comprising a body having an outer wall (2) and an inner wall (3) which is dimensioned such that it can completely enclose a U-shaped rod pair, wherein the body having the U-shaped rod pair enclosed thereby interacts with a crane, a cable hoist or a gripper in such a manner that the body can be removed from the reactor together with the U-shaped rod pair. It has been found that the use of such a device is without consequence to other rod pairs in the reactor.

The invention also relates to a method for the removal of polycrystalline silicon rods from a reactor, wherein the reactor comprises U-shaped rod pairs, wherein one of the U-shaped rod pairs is completely enclosed by a body having an outer wall and an inner wall, and the body together with the rod pair enclosed thereby is removed from the reactor by means of a crane, a cable hoist or a gripper.

BRIEF DESCRIPTION OF THE DRAWING

FIG. 1 illustrates one embodiment of a device of the invention.

DETAILED DESCRIPTION OF THE PREFERRED EMBODIMENTS

The body (1) is preferably dimensioned in such a manner that the length (L) thereof corresponds to at least the height (H) of the vertical rod pair (4). Preferably, the length is at least 2.5 m.

The width (Wi) of the body is preferably at least the width (W) of a U-shaped silicon rod pair (silicon bridge+rod diameter). Preferably, the width is at least 200 mm, more preferably at least 300 mm.

It has been found that a particularly safe and low-contamination removal of the silicon rods can be ensured when the body is configured with respect to the maximum width and depth thereof in such a manner that the distance from the adjacent rod pairs is a minimum of 1 cm. As a result, even rods that have grown crooked or highly club-shaped can be removed.

The removal of unstable polysilicon rods (e.g. having a high popcorn fraction, that is to say high surface roughness, or instability due to jumps on the silicon rod) is possible without problems. In particular, there is no danger that the total batch or individual rod pairs could fall down during the removal process.

Since rod removal proceeds pairwise, each silicon rod pair can be removed at any desired point in time. In particular, removal from the interior outwards is possible, which was not provided for with devices of the prior art. A targeted removal of a defined rod pair thus does not pose any difficulties.

Preferably, the body has an inner wall (3) made of steel. The inner wall of the body can be coated with a polymer. Preferably, the body consists of steel, that is to say comprises a steel shell.

Particular preference is given to an embodiment which provides a body having an uncoated steel inner wall, wherein the silicon rod pair is covered during removal with a plastic bag. This embodiment is particularly space-saving when the steel wall is as thin as possible. Coating the steel inner wall is not required in this case, since the plastic bag protects the silicon against contamination.

As an alternative to the uncoated steel wall in combination with a plastic bag, particular preference is also given to an embodiment of the body comprising a low-contamination hard metal (e.g. tungsten carbide, TiN or others) or otherwise, a low-abrasion ceramic.

Preference is also given to the use of a body containing a steel inner wall, wherein the inner wall of the body is partially or completely coated with such a low-contamination hard metal, or with a low-abrasion ceramic.

It is likewise preferred that the body consists of a flexible, but stable, plastic. Possible plastics here are a fiber composite plastic made of an aromatic polyamide (aramid fibers) or of a polyester such as polycarbonate or polyethylene terephthalate. Equally, materials of carbon or carbon components or glass fiber-reinforced plastics (GRP) are possible.

The silicon rod pair itself can be lifted out with the aid of a crane device, a cable hoist, or comparable systems.

Preferably, the body comprises at an opening (7) of the body a flap (5) which is closable manually or by means of a mechanical or electrical mechanism (8), in such a manner that the U-shaped rod pair may be enclosed completely in the body and thus may be lifted out of the reactor. The rod pair that has been lifted out is transported away to further processing operations preferably by means of a transport truck.

The use of grippers is also possible in order to remove the rods pairwise from the reactor. The grippers are preferably dimensioned in such a manner that they have a radius as small as possible and, even in the case of closely arranged rods in the reactor, still permit safe fixing of the rod pairs. A low-contamination and safe removal of the rod pairs by means of such grippers does not pose any difficulties. However, when such grippers are used, there is the disadvantage that, as in some solutions of the prior art, it is only possible to remove the rods from the outside towards the inside.

The invention permits the removal of very large silicon rods from a reactor without damaging or contaminating them.

By means of the invention it is possible to deposit the maximum rod diameter. The maximum possible rod diameter depends solely on the arrangement of the rods in the reactor and on the deposition process. To date, the deposition of rods having the maximum possible rod diameter was not possible, because there was no known possibility of removing such rods in a safe and low-contamination manner.

Also, inclined or club-shaped rods, likewise rods having high surface roughness or rods deposited in an unstable manner (having increased porosity), or mutually touching rods, can be removed without difficulties.

The invention may display its advantages, particularly, when the rods in the reactor are arranged particularly close.

The closeness in the reactor may be defined as the ratio of maximum silicon rod cross section of a batch divided by the area spanned by the reactor internal diameter. At a ratio between 0.2 and 0.5, it is not possible to remove rods pairwise by the known prior art. The devices according to US 20120237678 A1 and US 20100043972 A1, in contrast to the present invention, do not permit individual pairwise removal of very thick rods (closeness 0.2-0.5), since position and size of the rods are greatly restricted by the predetermined chambers in the removal system. If the rod diameters increase beyond the possible closeness factor (even if only for a few rod pairs in the entire reactor), both removal systems can no longer be used for removing the rods, since the excessively thick or inclined rods do not fit into the chambers provided therefor. In this case, attempts must be made by hand to remove the rods individually. This is very time-consuming, causes increased contamination of the silicon, and in addition is hazardous for the personnel (rods can drop down). In the worst case, the entire batch must be intentionally discarded.

The present invention provides that the rod removal proceeds pairwise, and the deposition reactor comprises an even number of rods. Preferably, the number of rods is at least 24. The rods preferably have a diameter of at least 145 mm.

The invention claimed is:

1. A method for the removal of polycrystalline silicon rods from a reactor, wherein the reactor comprises U-shaped rod pairs, comprising:
    enclosing one U-shaped rod pair by a body of a device for the removal of polycrystalline silicon rods from the reactor containing U-shaped rod pairs, comprising the body of the device having an outer wall, an inner wall which is dimensioned such that it can completely enclose one U-shaped rod pair, an opening at a lower end thereof, and a flap to minimize contamination wherein the body having the U-shaped rod pair is capable of being lifted in such a manner that the body together with the one U-shaped rod pair can be removed from the reactor;
    removing the body together with the rod pair enclosed thereby;
    wherein the body inner wall is made of steel; and
    covering the rod pair with plastic prior to the rod pair being enclosed by the body.

2. The method of claim 1, wherein the body is dimensioned such that the length thereof corresponds to at least the height of the one U-shaped rod pair and an internal width thereof corresponds to at least the width of the one U shaped rod pair.

3. The method of claim 1, wherein the rod pair is covered with a plastic bag prior to enclosure with the body.

4. The method of claim 1, wherein the body is made of a low-contamination hard metal, or is made of a plastic.

5. The method of claim 1, wherein the inner wall is coated with a plastic.

6. The method of claim 1, wherein the inner wall is partially or completely coated with a low-contamination hard metal.

7. The method of claim 1, wherein the body is a flexible body made up of a plastic material.

8. The method of claim 1, wherein the body, after enclosing the one rod pair, is sized such that the distance from adjacent rod pairs and the outside of the device is a minimum of 1 cm.

9. The method of claim 1, wherein the rods in the reactor are arranged closely in the reactor such that, after termination of the deposition, a ratio of maximum silicon rod cross section to the area spanned by the reactor internal diameter is 0.2 to 0.5.

10. The method of claim 1, wherein the diameter of the silicon rods is at least 145 mm.

11. The method of claim 1, wherein the body walls are sized such that the body may enclose rods in a Siemens reactor having a closeness ratio of from 0.2 to 0.5; and
    wherein the body has walls of steel coated with plastic such that a rod pair enclosed within the body can directly contact each wall without contamination.

12. The method of claim 1, wherein the flap is closable; and
    wherein the method further comprises closing the flap manually or by a mechanical or electrical mechanism.

13. A method for removal of polycrystalline silicon rods from a reactor, wherein the reactor comprises U-shaped rod pairs, the method comprising:
    enclosing one U-shaped rod pair by the body of a device having an outer wall, an inner wall which is made of steel and dimensioned such that it can completely enclose one U-shaped rod pair, an opening at a lower end thereof, and a flap wherein the body having the U-shaped rod pair is capable of being lifted in such a manner that the body together with the one U-shaped rod pair can be removed from the reactor; and
    removing the body together with the rod pair; and
    covering the rod pair with plastic prior to the rod pair being enclosed by the body.

14. The method of claim 13, wherein the rod pair is covered with a plastic bag prior to enclosure with the body.

15. The method of claim 13, wherein the inner wall is coated with a plastic.

16. The device of claim 13, wherein the inner wall is partially or completely coated with a low-contamination hard metal.

17. The method of claim 13, wherein the body, after enclosing the one rod pair, is sized such that the distance from adjacent rod pairs and the outside of the device is a minimum of 1 cm.

18. The method of claim 13, wherein the rods in the reactor are arranged closely in the reactor such that, after termination of the deposition, a ratio of maximum silicon rod cross section to the area spanned by the reactor internal diameter is 0.2 to 0.5.

19. The method of claim 13, wherein the body walls are sized such that the body may enclose rods in a Siemens reactor having a closeness ratio of from 0.2 to 0.5; and
    wherein the body has walls of steel coated with plastic such that a rod pair enclosed within the body can directly contact each wall without contamination.

20. The method of claim 13, wherein the flap is closable; and
    wherein the method further comprises closing the flap manually or by a mechanical or electrical mechanism.

* * * * *